United States Patent [19]

Barnes et al.

[11] 4,412,303
[45] Oct. 25, 1983

[54] ARRAY PROCESSOR ARCHITECTURE

[75] Inventors: George H. Barnes; Stephen F. Lundstrom, both of Wayne; Philip E. Shafer, Holmes, all of Pa.

[73] Assignee: Burroughs Corporation, Detroit, Mich.

[21] Appl. No.: 97,191

[22] Filed: Nov. 26, 1979

[51] Int. Cl.³ .................. G06F 15/16; G06F 15/20
[52] U.S. Cl. .................................................. 364/900
[58] Field of Search ... 364/200 MS File, 900 MS File

[56] References Cited

U.S. PATENT DOCUMENTS 3,537,074 10/1970 Stokes et al. .................. 364/200
4,051,551 9/1977 Lawrie et al. ................. 364/200
4,101,960 7/1978 Stokes et al. .................. 364/200

OTHER PUBLICATIONS

Concurrency: Single Processor Systems by Siewiork, Bell and Newell from Computer Structures (McGraw-Hill, Inc.), 1980.
Illiac IV System Proc. IEEE, Apr. 1972, pp. 369–388.
STARAN Proceedings Fall Joint Computer Conference 1972, pp. 229–241.
STARAN Proceedings National Computer Conference 1974, pp. 405–410.
C.mmp/Hydra Project-Carnegie Mellon University-1971.

Primary Examiner—Gareth D. Shaw
Assistant Examiner—John G. Mills
Attorney, Agent, or Firm—Leonard C. Brenner; M. L. Young; K. R. Peterson

[57] ABSTRACT

A high speed parallel array data processing architecture fashioned under a computational envelope approach includes a data base memory for secondary storage of programs and data, and a plurality of memory modules interconnected to a plurality of processing modules by a connection network of the Omega gender. Programs and data are fed from the data base memory to the plurality of memory modules and from hence the programs are fed through the connection network to the array of processors (one copy of each program for each processor). Execution of the programs occur with the processors operating normally quite independently of each other in a multiprocessing fashion. For data dependent operations and other suitable operations, all processors are instructed to finish one given task or program branch before all are instructed to proceed in parallel processing fashion on the next instruction. Even when functioning in the parallel processing mode however, the processors are not locked-step but execute their own copy of the program individually unless or until another overall processor array synchronization instruction is issued.

8 Claims, 9 Drawing Figures

ARRAY PROCESSOR ARCHITECTURE

The invention described herein was made in the performance of work under NASA Contract No. NAS 2-9897 and is subject to the provisions of Section 305 of the National Aeronautics and Space Act of 1958 (72 Stat. 435, 42 U.S.C. 2457).

RELATED U.S. PATENT APPLICATIONS

U.S. patent applications directly or indirected related to the subject applications are as follows: Ser. No. 097,419, filed Nov. 26, 1979 by George H. Barnes et al and titled Array Processor Architecture Connection Network.

BACKGROUND AND OBJECTS OF THE INVENTION

This invention relates generally to large scale data processing systems and more particularly to systems employing a plurality of processors operating more or less simultaneously in order to reduce overall program execution time.

In the development of digital computers a most important design goal has always been to maximize their operating speed, i.e., the amount of data that can be processed in a unit of time. It has become increasingly apparent in recent times that two important limiting conditions exist within the present framework of computer design. These are the limits of component speed and of serial machine organization. To overstep these limitations two different types of parallel operating systems have been developed.

First, multiprocessing systems have been developed wherein a number of quite independent processors have been linked together to operate in parallel on differing portions of a program or job in order to speed execution of that program or job. Frequently, the processors are linked together in a network loop or similar fashion, thus greatly slowing the cooperation between processors. When the processors are linked together by a parallel and much faster network such as a crossbar network, the network control mechanism and the cost and reliability of the network quickly become unwieldly for a reasonable large number of processors.

Second, high speed parallel locked-step processing systems have been developed providing an array of processing elements under the control of a single control unit.

As speed requirements of computation have continued to increase, systems employing greater numbers of parallel memory modules have been developed. One such system has in the order of 64 parallel memories, see U.S. Pat. No. 3,537,074, issued Oct. 27, 1970, to R. A. Stokes et al, and assigned to the assignee of the present invention. However, parallel processors have not been without their own problems.

Primarily, parallel processors are often so far removed from the conventional scaler processors that they are hard to program. Secondarily, parallel processors are fashioned to operate efficiently with vectorized data but are quite inefficient operating upon scaler data. Finally, parallel processors, being found operating a locked-step fashion in prior art force all processors in the parallel array thereof to perform in synchronization whether or not such operation is needed in all processors.

The manner of difficulty in programming the parallel array has been greatly eased by the incorporation and use of the computational envelope approach as disclosed in U.S. Pat. No. 4,101,960, issued July 18, 1978, in the name of Stokes et al, and assigned to the assignee of the present invention. Briefly in the computational envelope approach a host or support processor of a general processing variety (such as a Burroughs B7800) functions as an I/O controller and user interface. Special purpose jobs are transferred in their entirety (program and data) to a large high speed secondary storage system or data base memory and from hence to the array memory modules and array processor for processing. During the special purpose processing period the front end support or host processor is freed for other processing jobs. Once the complete special purpose job or task is executed by the array processors, the resultants therefrom are returned through the array memories and the data base memory to the support processor for output to the user.

It is an object of the present invention to provide a processing array functioning in the computational envelope mode of operation.

It is another object of the present invention to provide an array of processors which can function efficiently and effectively both in multiprocessing and parallel processing.

It is yet another object of the present invention to provide a method and apparatus for quickly and efficiently synchronizing an array of independent processors to begin a task in parallel.

SUMMARY OF THE INVENTION

In carrying out the above and other objects of this invention, there is provided a support processor, a parallel processing array, a coordinator for issuing special commands to the array and a large data base memory having high speed I/O paths to the support processor and to the memory modules of the parallel processing array.

In operation, the support processor is programmed in a high level language and transfers complete parallel tasks to the data base memory whereupon the support processor is freed to perform general purpose or other tasks. Upon parallel task completion, complete files are transferred back to the front end processor for the data base memory.

The parallel processing array efficiently processes vector and other data elements in a parallel but not a locked-step fashion. When required, all processors may be brought to a halt upon completing one instruction before proceeding all in parallel on the next instruction. The parallel processors are connected to an array of memory modules through an Omega type connection network.

Various other objects and advantages and features of this invention will become more fully apparent in the following specification with its appended claims and accompanying drawings wherein:

DESCRIPTION OF THE PREFERRED EMBODIMENT

Figure 1:
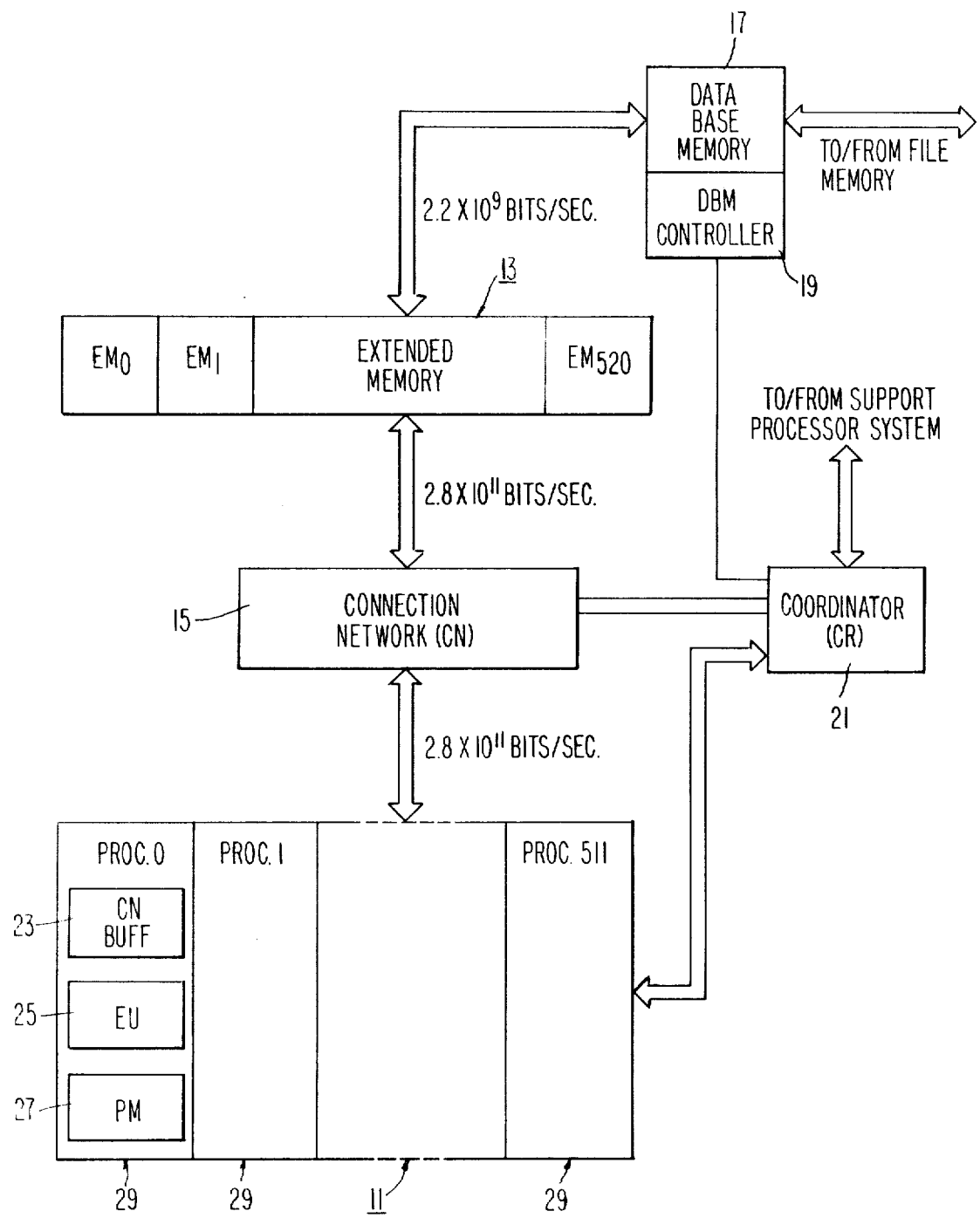
FIG. 1 is a block diagram showing the environmental architecture of the present invention.

The present invention, see FIG. 1, comprises five major component elements; namely, the processor array 11, the extended memory module array 13, the connection network 15 interconnecting the processor array 11 with the extended memory module array 13, the data base memory 17 with data base memory controller 19 for staging jobs to be scheduled and for high-speed input/output buffering of jobs in execution, and the coordinator 21 used to synchronize the processor array 11 and coordinate data flow through the connection network 15.

In operation, all data and program for a run is first loaded into the data base memory 17 prior to the beginning of the run. This loading is initiated by a Support Processor System (not shown) which functions as a user and input/output interface to transfer under control of a user data and programs from a secondary storage file memory (not shown). The use of such a Support Processor System is detailed in the above-cited U.S. Pat. Nos. 3,537,074 and 4,101,960.

As the run is initiated, the data base memory controller 19 transfers code files from the data base memory 17 to the extended memory module array 13. Then the data base memory controller 19 transfers the processor array 11 code files thereto and the necessary job data to the extended memory module array 13.

Once initated the present invention is capable of parallel execution in a manner similar to the lock-step array machines disclosed in U.S. Pat. Nos. 3,537,074 and 4,101,960. Simple programs (having a copy thereof resident in each processor of the processor array 11), with no data-dependent branching, can be so executed. However, the present invention is not limited to paralle mode operation since it can also function in the manner of a conventional multiprocessor and, in fact, may be a commmercially available general purpose processor. Thus, as will be detailed hereinafter, the present invention performs essentially just as efficiently whether the data is arranged in the form of vectors or not. The processor array 11 can function in the lock-step fashion for vector processing and in independent scalar fashion for multiprocessing operation.

A simple but illustrative example of the operation of the present invention involves the following vector calculation:
1. $A + B = C$
2. If C greater than 0 do subroutine W to calculate Z
3. If C equals 0 do subroutine X to calculate Z
4. If C less than 0 do subroutine Y to calculate Z
5. Calculate $D = A$ divided by Z With vector notation it is appreciated that A represents the elements $a_i$ from $a_l$ to $a_n$ wherein n equals the number of elements in the vector. The same relationship holds for vectors B, C, D and Z. Also it is appreciated that the elements of vectors are individually stored in memory modules of the extended memory module array 13 and that the elements are fetched therefrom and operated thereupon individually by the individual processors of the processor array 11.

The elemets of the vectors are loaded into the memory modules according to some particular mapping scheme. The simplest loading scheme would be to load the first vector element into the first memory module, the second vector element into the second memory module, etc. However, such a simple mapping does not lead to efficient parallel processing for many vector operations. Hence, more complex mapping schemes have been developed such as disclosed in U.S. Pat. No. 4,051,551, entitled "Multidimensional Parallel Access Computer Memory System", issued Sept. 27, 1977 in the names of Lawrie et al, and assigned to the assignee of the present invention. The mapping scheme disclosed therein is incorporated in the "Scientific Processor" of U.S. Pat. No. 4,101,960, issued July 18, 1978, in the name of Stokes et al and assigned to the assignee of the present invention.

The actual mapping scheme selected is relatively unimportant to the basic operation of the present invention. It is important however, that the rule of the mapping scheme be stored in processor array 11 so that each processor therein can calculate by that rule where the vector element is stored that must be fetched. For example, if the first processor is always to fetch from the first memory module 13, and the second process from the second memory module 13, etc. the instruction stored in each processor would express "fetch element specified from memory i" where "i" would be the processor 29 number. As will be detailed later, each processor 29 has wired in, preferably in binary format, its own processor number and each memory module likewise. It will also be appreciated that each stored element is identified as being stored in a particular memory module 13 at a particular storage location therein. The exact storage location is a direct function of the mapping used to store the element. This mapping is known and stored as a subroutine in each processor 11 to determine from whence it is to fetch its particular element.

As will also be detailed later, the connection network 15 can be set to "broadcast" to all processors 11 simultaneously. Thus in one transferance it can store a copy of mapping subroutines and other program instructions in each processor 29.

Following loading of the program instructions the execution of the problem or job to be solved begins. In the example, above, each processor 29 fetches its element $a_i$ of vector A and its element $b_i$ of vector B to calculate by addition its elements $c_i$ of vector C. Since the processors are all doing the same thing, the above fetching and calculating occurs nearly in parallel.

However, each processor is now storing a value $c_i$ which is either greater than, equal to, or less than zero. It performs the appropriate subroutine to calculate its element $z_i$ of Z. Thus in sharp contrast to prior art locked-step processors, the processors 29 of the present invention are not all proceeding on the same branch instruction simultaneously.

Assuming now that the entire vector Z must be determined before the next step can be executed each processor calculating a vector element $z_i$ issued a flag indicating "I got here" or that it has successfully completed its last instruction, that of calculating $z_i$. That processor 29 is halted. The Coordinator 21 monitors all processors 29 that are calculating a vector element $z_i$. When all such processors 29 issue their "I got here" flag, the Coordinator 21 issues a "GO" signal and all processors 29 then begin the next instruction (in the present example, that of calculating vector element $d_i$ of D). Thus, the processors 29 can function independently and effectively but still be locked in parallel by a single instruction when such parallel operation is called for.

Following calculation of the elements di of the vector D, the vector D is fed back through the connection network 15 to the extended memory module 13 and from hence through the data base memory 17 to the user.

The above simplified illustrative example of the operation of the present invention presented on overview of the structure and function of the present invention. A fuller understanding may be derived from a closer examination of its component parts.

The processor array 11 consists of 512 independent like processors 29 noted as Processor 0 through Processor 511 in FIG. 1. Each processor 29 includes a connection network buffer 23, an execution unit 25 and a local processor memory 27. The number of processors 29 in the processor array 11 is selected in view of the power of each processor 29 and the complexity of the overall tasks being executed by the processor array 11. Alternate embodiments may be fabricated employing more or less than 512 processors 29 having less or more processing capability than detailed below.

Processor

In the array of 512 (516 counting spares) processors 29, each processor is identical to all others except for an internal identifying number which is hardwired into each processor (by 10 lines representing in binary code the number of the processor) in the preferred embodiment but may be entered by firmware or software in alternate embodiments. It is of importance only that when data is to flow to or from processor number 014 (for example) that a single processor 29 is identified as being number 014.

Figure 2:
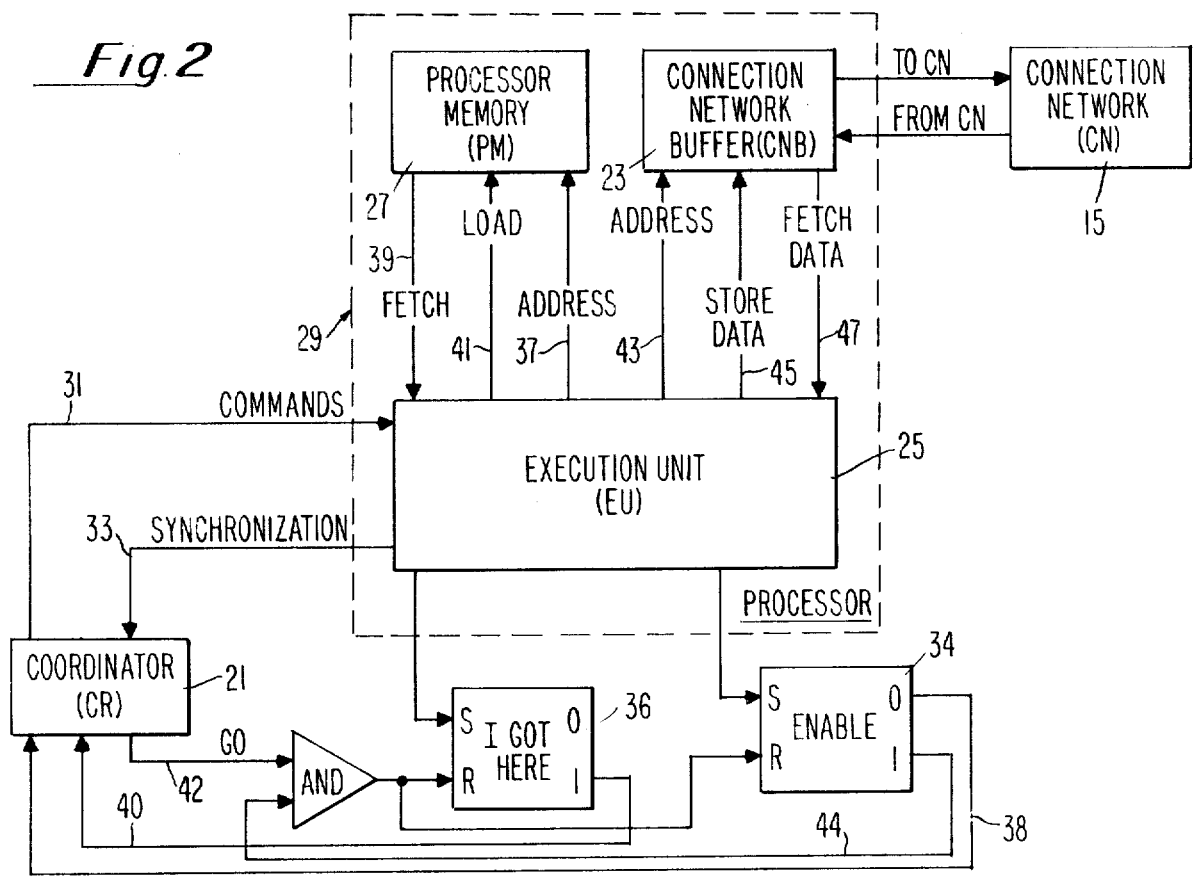
FIG. 2 is a diagram of the major component parts of a processor used in a processing array in the present invention.

Each processor 29 is in itself a conventional FORTRAN processor functioning to execute integer and floating-point operations on data variables. Each processor 29, see FIG. 2, is partitioned into three parts; namely, the Execution Unit 25, the Processor Memory 27, and the Connection Network Buffer 23.

The Execution Unit 25 is the logic part of the Processor 29. The Execution Unit 25 executes code contained in its Processor Memory 27, fetches and stores data through the Connection Network 15 via its Connection Network Buffer 23. As will be detailed hereinafter, the Execution Unit 25 also accepts commands from the Coordinator 21 via the Command Line 31 and synchronization via the Synchronization Line 33. The Execution Unit 25 executes instructions stored in its Processor Memory 27 by addressing same through Address Path 37 to fetch instruction code on Fetch Line Path 39 or to store instruction code on Store Path 41. Likewise, data is transferred through the connection network 15 via the connection network buffer 23 through the Address Path 43, the store data path 45, and the fetch data path 47.

Associated with the execution unit 25 is an enable flip-flop 34 and a I-got-here flip-flop 36. A flag bit programmed into the code executed by the execution unit 25 indicates when the execution unit 25 is executing an instruction or task which must be concluded by itself and before all other like execution units 25 working on the same data proceed with further instructions. This flag bit sets enable flip-flop 34 thereby raising the enable output line 44 therefore and deactivating the non-enable line 38 thereof which is fed to the coordinator 21 to indicate which processors 29 are not enabled. When the instruction or task is completed by the execution unit 25 (i.e., the calculation by "Z" in the example above), a bit is sent out to set the "I-got-here" flip-flop 36 which raises its I-got-here output line 40 to the coordinator 21. The coordinator 21 thereup issues a command via its command and synchronization lines 31 and 33 to halt the processor 29 until the coordinator 21 receives an I-got-here signal from all enabled processors 29. Then a "GO" signal is used from the coordinator 21 through line 42 and AND gate 44 to reset the I-got-here flip-flop 36 and the enable flip-flop 34. The Coordinator 21 also releases its halt commands through lines 31 and 33 and all processors 29 begin in parallel to execution of the next task or instruction which usually involves the fetching of freshly created or modified data from the extended memory array 13 through the connection network 15.

The Processor Memory 27 holds instructions for execution of the Execution Unit 25 and the data to be fetched in response to the instructions held. Preferably, the Processor Memory 27 is sufficient for storage of over 32,000 words of 48 bits plus 7 bits of error code each. Data, address and control communications is solely with the Execution Unit 25.

The Connection Network Buffer 23 functions as a asynchronous interface with the Connection Network 15 to decouple the Processor 29 from the access delays of the Connection Network 15 and the extended Memory Module Array 13 (FIG. 1). The Connection Network Buffers 23 communicates basically three items; the number of a particular Memory Module in the Extended Memory Module Array 13 with which communication is desired plus the operation code (i.e., fetch, store, etc.), the address within the particular Memory Module, and one word of data. The presence of an Extended Memory Module number in the Connection Network Buffer 23 functions as a request for that Extended Memory Module. An "acknowledge" signal is returned via the Connection Network 15 from the Extended Memory Module selected to indicate the success of the request.

Each and every Connection Network Buffer 23 is clock-synchronized with the Connection Network 15 to eliminate time races therethrough.

Coordinator

Figure 3:
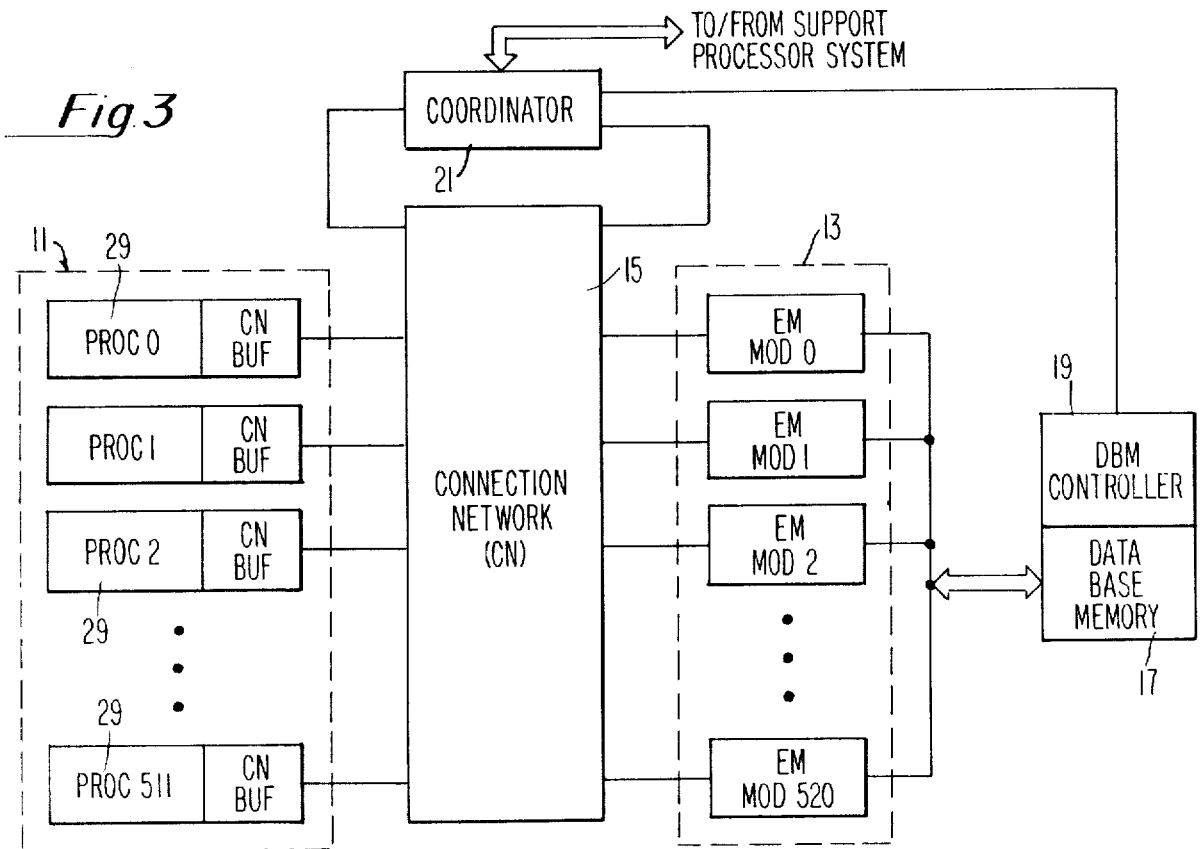
FIG. 3 depicts the arrangement of a coordinator in the architecture of the present invention.

The Coordinator 21, as seen in FIG. 3, in essence performs two major functions: first, it communicates with the Support Processor primarily to load jobs into and results out of the data base memory 19; second, it communicates with the processors 29 in order to provide synchronization and control when all processors 29 are to operate in parallel on a particular piece of data or at a particular step in a program.

The coordinator's function in communicating with the Support Processor is relatively simple under the computational envelope approach such as detailed, for example, in U.S. Pat. No. 4,101,960. Under the computational envelope approach all data and programs for at least one job is transferred from the Support Processor to the Data Base Memory 17. Thereafter, the Support Processor is freed. Program and data are transferred to the Extended Memory Module Array 13 and eventually to the Processor Array 11 for processing. Upon completion of the processing, results are communicated back to the Data Base Memory 17 and finally back to the Support Processor.

Figure 4:
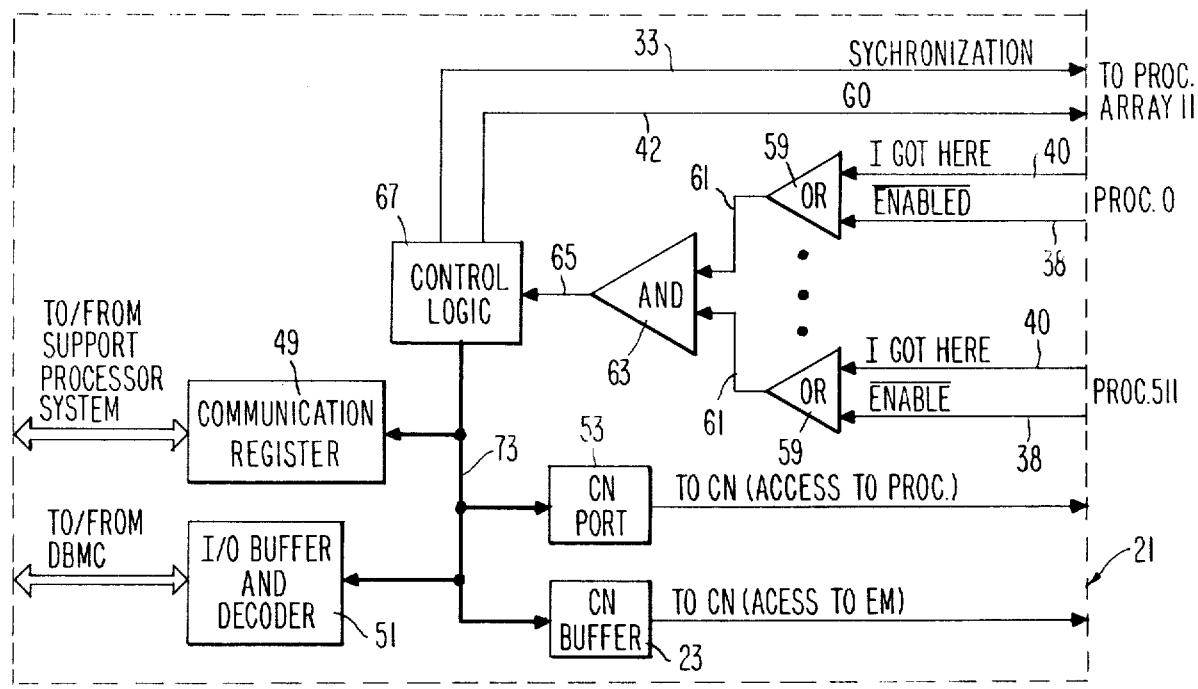
FIG. 4 is a detailed diagram of the coordinator of FIG. 3.

Communication is maintained between the Coordinator 21 and the Support Processor via a Communication Register 49 and with the Data Base Memory Controller 19 through an I/O Buffer and Decoder 51, see FIG. 4.

A Connection Network Buffer 23 identical in structure and function to the Connection Network Buffer 23 of each Processor 29 (see FIG. 2) permits the Coordinator 21 to communicate with the Extended Memory Module Array 13 through the Connection Network 15 as easily as if it were a Processor 29. Likewise, a Connection Network Port 53 permits the Coordinator 23 to Communicate with the Processors 29 through the Connection Network 15 as easily as if it were a memory module in the Extended Memory Module Array 13.

Other important links to the Coordinator 23 from the Processors 29 are via the "I got here" lines 40 and the NOT Enabled lines 38 from each Processor 29. By ORing the lines 38 and 40 individually for each Processor 29 in an OR circuit 59 and summing all OR circuit 59 output lines 61 through an AND circuit 63 an output 65 is obtained which signifies that every enabled Processor 29 has finished its current processing task and raised its "I got here" line 40. The output line 65 is fed through Control Logic 67 to issue a "GO" signal on GO line 42 to release all enabled Processors 29 and allow them to continue processing in parallel. The control logic 67 also provides on line 33 the synchronization for the Processors 29 to provide proper timing between the Processors 29 and the Connection Network 15. Further, the Control Logic 67 provides standard commuication control on a Communication Bus 73 between the Communication Register 49, I/O Buffer and Decoder 51, Connection Network Port 53, and the Communication Network Buffer 23.

Extend Memory Module

The Extended Memory Module 13 is the "main" memory of the present invention in that it holds the data base for the program during program execution. Temporary variables, or work space, can be held in either the Extended Memory Module 13 or the Processor Memory 27 (see FIG. 1), as appropriate to the problem. All I/O to and from the present invention is to and from the Extended Memory Module 13 via the Data Base Memory 19 (see FIG. 1). Control of the Extended Memory Module 13 is from two sources; the first being instructions transmitted over the Connection Network 15 and the second being from the Data Base Memory Controller 19 (see FIG. 1) which handles the transfers between the Data Base Memory 19 and the Extended Memory Module 13.

In the preferred embodiment of the present invention there are 521 individual memory modules in the Extended Memory Module 13. The number 521 is chosen because it is a prime number larger than the number (512) of Processors 29. The combination of 521 Memory Modules 13 with 512 Processors 29 facilitates vector processing as detailed in U.S. Pat. Nos. 4,051,551 and 4,101,960.

Each memory module 13 is identical to all others except that it has its own module number (i.e., 0-520) associated with it, preferable in a hardwired binary coded form. The purpose of having a memory module 13 numbered is to provide identification for addressing. Storage locations within each memory module 13 are accessed by the Memory Module number and storate location within that memory module comprising in essence the total address.

Figure 5:
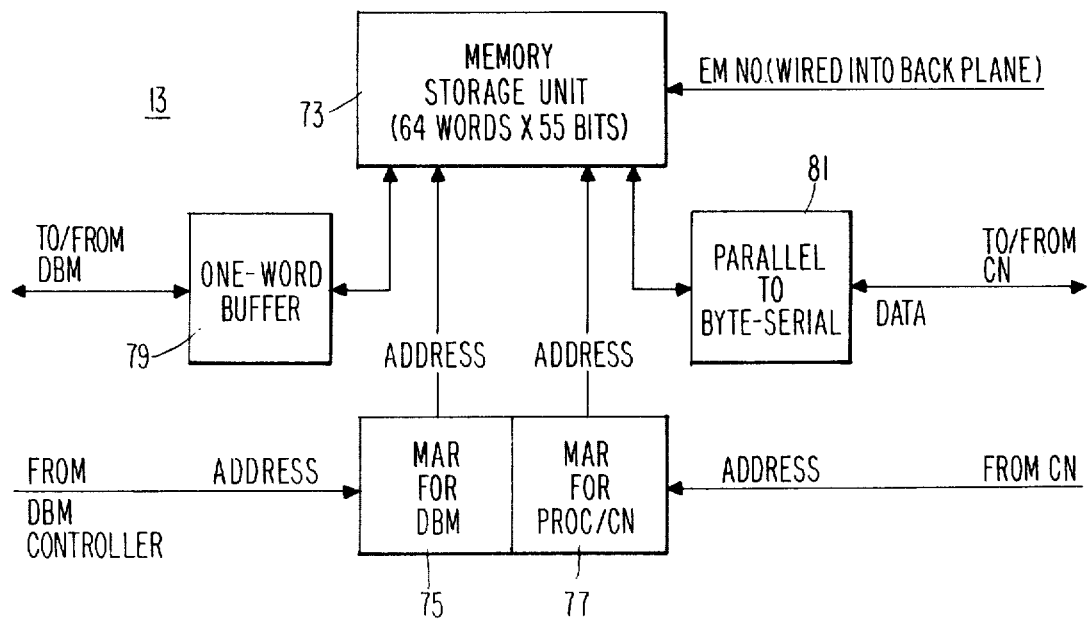
FIG. 5 is a diagram of the major component parts of a memory modules used in an extended memory module array in the present invention.

Each memory in the Extended Memory Module 13 is conventional in that it includes basic storage and buffering for addressing and data, see FIG. 5. Basic storage is provided in the preferred embodiment by a Memory Storage Unit 73 sufficient to store 64,000 words each having 55 bits (48 data bits and 7 checking bits). High speed solid state storage is preferred and may be implemented by paralleling four 16K RAM memory chips.

Standard address registers are also provided; a First Memory Address Register 75 for addressing from the Data Base Memory 17 and a second Memory Address Register 77 for addressing from the Processors 29 via the Connection Network 15. Data Buffering is provided by a one-word buffer 79 for data communication with the Data Base Memory 17 and a parallel-to-byte-serial buffer 81 for communication through the Connection Network 15. Byte communication rather than word communication is handled through the Connection Network 15 to minimize the number of data paths and switching paths required therethrough. Alternate embodiments may extend, for example, to bit communication which is simple but slow to word communication which is relatively faster but likewise quite expensive and massive in hardware implementation.

Communication through the connection network 15 and the Extended Memory Module 13 is straightforward. A strobe signal and accompanying address field indicates the arrival of a request for a particular Extended Memory Module by number. The requested number is compared to the actual memory module number (preferably hardwired in binary coded format) and a true comparison initiates an "acknowledge" bit to be sent back to the requesting Processor 29 and to lock up the connection Network 15 path therebetween.

As will be detailed hereinafter, following the strobe, and accompanying the address field, will be any one of four different commands, namely:

(1) STOREM. Data will follow the address; keep up the acknowledge until the last character of data has arrived. The timing is fixed; the data item will be just one word long.

(2) LOADEM. Access memory at the address given, sending the data back through the Connection Network 15, meanwhile keeping the "acknowledge" bit up until the last 11 bit frame has been sent.

(3) LOCKEM. Same as LOADEM except that following the access of data, a ONE will be written into the least significant bit of the word. If bit was ZERO, the pertinent check bits must also be complemented to keep the checking code correct. The old copy is sent back over the Connection Network 15.

(4) FETCHEM. Same as LOADEM except that the "acknowledge" is dropped as soon as possible. The Coordinator 21 has sent to this code to imply that it will switch the Connection Network 15 to broadcast mode for the accessed data. The data is then sent into the Connection Network 15 which has been set to broadcast mode by the Coordinator 21 and will go to all processors 29.

Connection Network

The Connection Network 15 has two modes of operations. In a special purpose mode detailed hereinafter the Coordinator 21 may use the Connection Network 15 to perform special tasks. In the special mode, a typical operation for the Connection Network 15 is the "Broadcast" operation wherein under command from the Coordinator 21 a word of data is "broadcast" to all processors 29 from either the Coordinator 21 or a selected particular Extended Memory Module 13.

In the normal mode of operation a "request strobe" establishes a two-way connection between the requesting processor 29 and the requested Extended Memory Module 13. The establishment of the connection is acknowledged by the requested Extended Memory Module 13. The "acknowledge" is transmitted to the requester. The release of the connection is initiated by the Extended Memory Module 13. Only one request arrives at a time to a given Extended Memory Module 13. The connection Network 15, not the Extended Memory Module 13 resolves conflicting responses.

Figure 6:
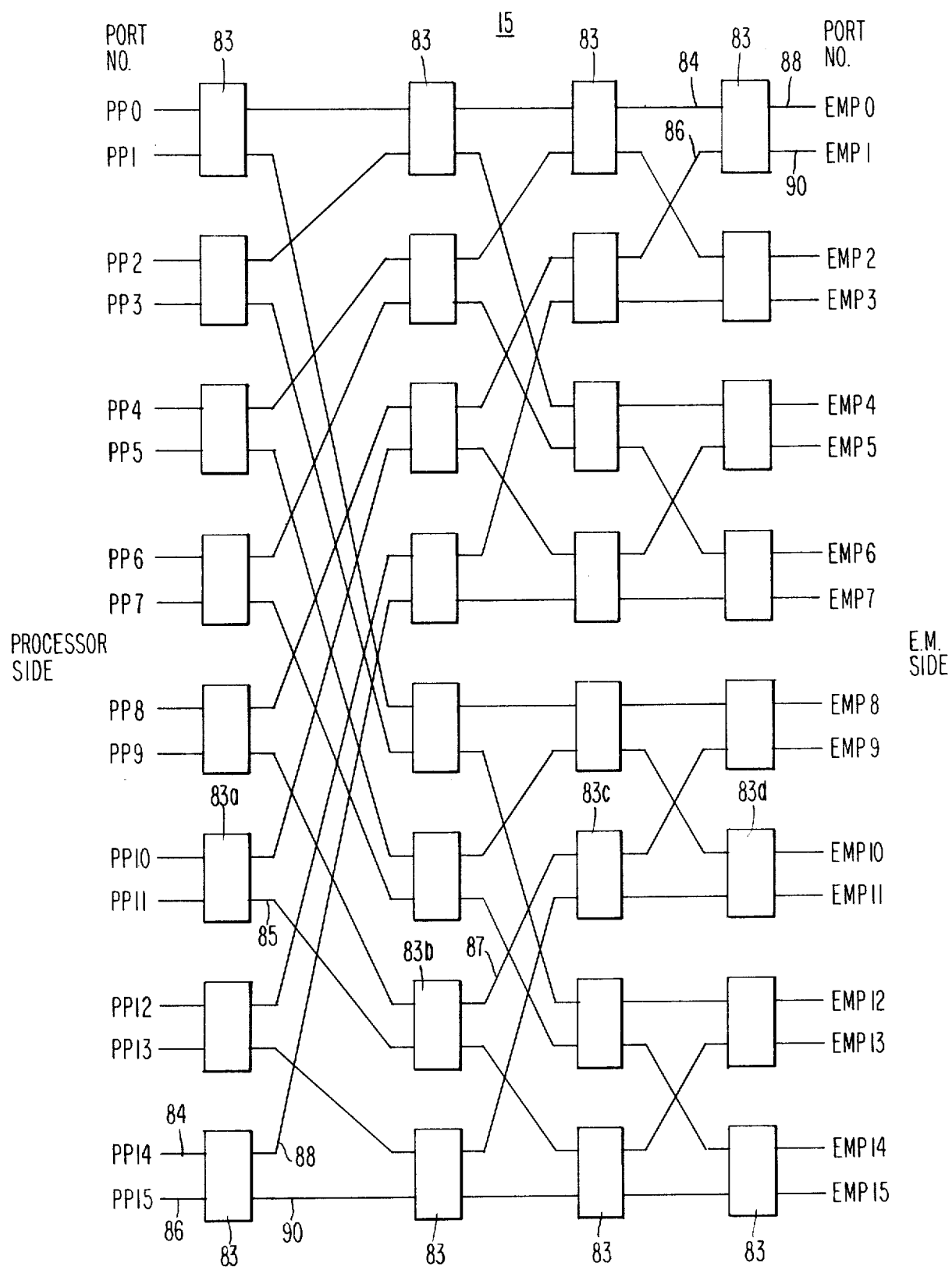
FIG. 6 is a diagram of a partial portion of the Omega-type connection network used to interpose the processors of FIG. 2 and the memory modules of FIG. 5.

With reference to FIGS. 1 and 6, the Connection Network 15 appears to be a dial-up network with up to 512 callers, the processors 29, possibly dialing at once. There are 512 processor ports (only 16 shown, PP0-PP15), 521 Extended Memory Ports (only 16 shown, EMP0-EMP15), and two Coordinator ports (see FIG. 4), one the Connection Network Port 53 functioning as an Extended Memory Port and the other, the Connection Network Buffer 23 functioning as a processor port.

With reference now to FIG. 6, it can be seen that the Connection Network 15 is a standard Omega Network comprised of a plurality of switching elements 83 wherein each switching element 83 is in essence a two-by-two crossbar network.

Addressing is provided by the requester and is decoded one bit at a time on the fly by the Connection Network 15. Consider for example, that processor port PP10 desires communication with Extended Memory Port EMP11. The processor port PP10 transmits the Extended Memory Port EMP11 number in binary form (1011). Each switching element 83 encountered examines one bit in order from the most significant bit to the least. Thus switch elements 83a examines a binary one and therefore outputs on its lower (reference FIG. 6) line 85. Switch element 83b examines a binary zero and therefore outputs on its top line 87. Switch elements 83c and 83d both examine binary ones leading to a final output to EMP11. For EMP11 to communicate back to PP10 a binary representation of ten (1010) is transmitted thereby causing in the above described manner communications to be established through switch elements 83d, c, b, and a to PP10.

For a special or "broadcast" mode of operation it can be seen from FIG. 6 that if all switch elements 83 were to establish dual communication paths therethrough communication could be established between any one Extended Memory Port EMP0 through EMP15 to all processor ports PP0 through PP15. Likewise communication can be broadcast from any one of the processor ports PP0 through PP15 to all of the Extended Memory Ports EMP0 through EMP15.

Although only 16 processor ports (PP0-PP15) and 16 Extended Memory Ports (EMP0-EMP15) are shown in FIG. 5, the Omega type connection network 15 is readily expandable to handle any number of processor and memory ports.

Figure 7:
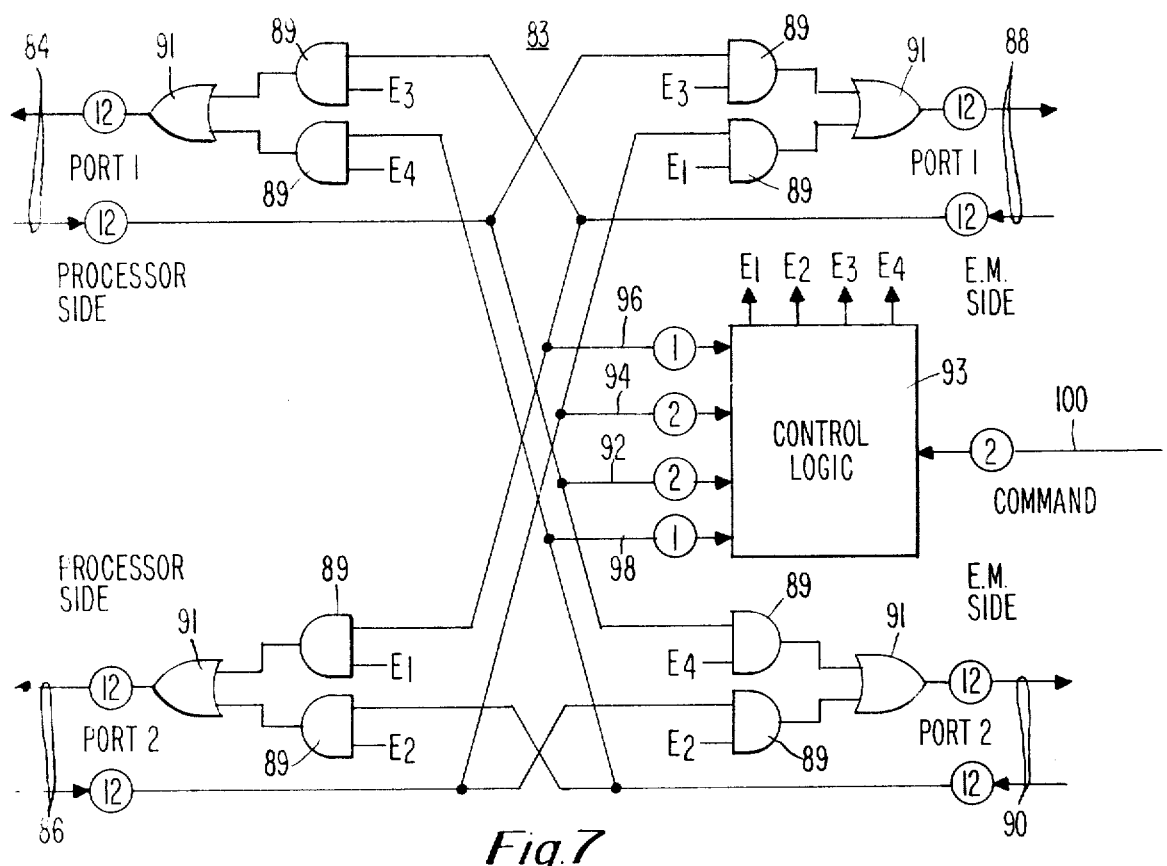
FIG. 7 is a logic diagram of a 2×2 crossbar switching element used in the Omega network of FIG. 6.

Each switch element 83 has an upper or first processor side port 84, a lower or second processor side port 86, an upper or first extended memory side port 88 and a lower or second extended memory side port 90. Further, each switch element 83 includes a plurality of AND logic gates 89, a plurality of OR logical gates 91, and a control logic circuit 93, see FIG. 7. The control logic examines one bit of the data flowing to the switch element 83 to control the passage of data therethrough in accord with the above-described operation.

The control logic circuit 93 generates control signals E1, E2, E3 and E4 to control the flow of data through the switch element 83. The control logic circuit is fed by two bits each from the upper and lower processor ports 84 and 86. The two bits from the upper processor port 84 are inputted on line 92. One of the bits is a strobe signal indicating that an addressing request is passing through the switch element 83 and the other bit indicates whether the request is to exit through upper port 88 or lower port 90. As will be detailed, the control logic circuit 93 recognizes the strobe bit and honors the exit request if the requested exit port is free. The control logic circuit 93 will also keep the requested path through the control logic circuit 83 open or locked long enough for an "acknowledge" signal to return from the Extended Memory Module 113 indicating a successful path connection through the entire connection network 15. The "acknowledge" signal will keep the path connection locked for a time sufficient to pass the desired data therethrough. If no "acknowledge" signal is returned within a time sufficient for the request to travel through the connection network 15 and the "acknowledge" signal echoed back, then the control logic circuit 93 will release the requested path through the switch element 83.

The control logic circuit 93 receives the two bits above-described from input line 92 and a similar two bits from the lower processor port are inputted on line 94. The "acknowledge" bit arriving through the upper Extended Memory Port 88 is inputted on line 96 while the "acknowledge" bit arriving through the lower Extended Memory Port 90 is inputted through line 98. Two commands from the Coordinator 21 are received on line 100. Although the control logic circuit 93 is shown in more detail in FIG. 8, it is appreciated that many alternative embodiments could be fashioned to fulfil the function of the control logic circuit 93 as above-described. The control logic circuit 93 includes in the FIG. 8 embodiment thereof four identical input AND gates 102a through 102d for summing the above-described strobe and exit port request bits. Two inverter gates 104a and 104b are provided to complement the exit port request bits. Four strobe circuits 106a through 106d are provided. Each strobe circuit 106 when triggered remains "ON" for a period of time sufficient for an "acknowledge" signal to arrive back if a successful path is completed through the entire connection network 15. Each strobe circuit 106 feeds through an OR gate 108 shown individually as OR gates 108a through 108d to produce an energizing signal E identified individually as E1 through E4 to open and hold open the request path through the switching element 83 (see FIG. 7).

Figure 8:
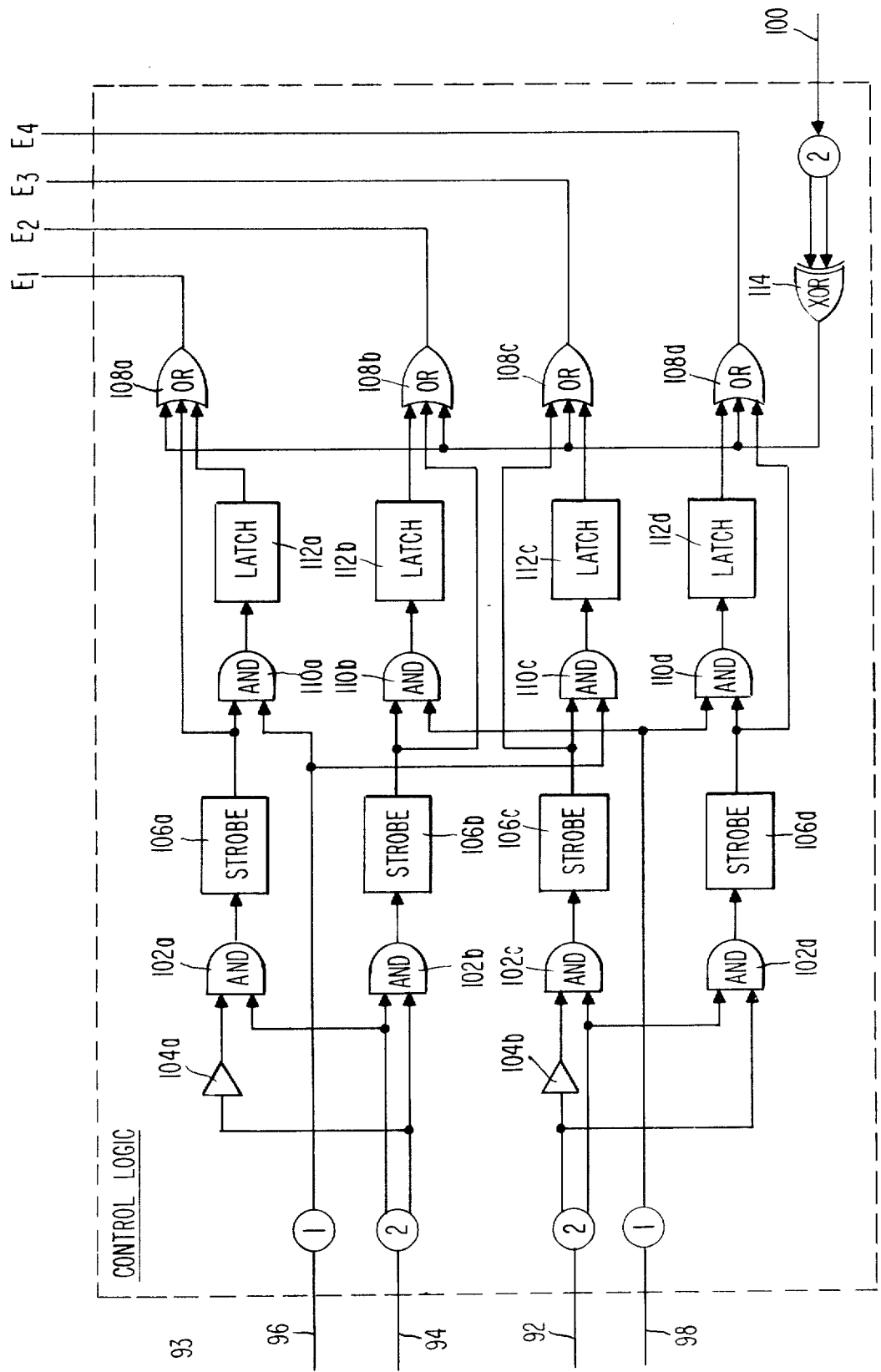
FIG. 8 is a circuit diagram of a control logic circuit used in the crossbar switching element of FIG. 7.

Single "acknowledge" bits are sent back on lines 96 and 98 and are combined through AND gates 110a through 110d with the outputs of the strobe circuits 106a through 106d as shown in FIG. 8 to initiate a latch circuit 112 shown individually as latch circuits 112a through 112d to "latch" or keep locked the requested path through the switching element 83 for a period sufficient to pass at least an entire data word of 55 bits therethrough, 11 bits at a time. It is realized that the strobe 106 and latch 112 circuits may be fashioned as monostable multivibrators or other delay or timing devices depending on the length of time (i.e., how many nanoseconds) the strobe latch is required to be "ON". The length of time required is dependent upon the type of circuit elements chosen, the size and the clocking speed of the connection network 15.

In an alternate or special mode of operation a two bit signal is received from the Coordinator 21 on line 100 and processed through exclusive OR circuit 114 and OR gates 108a through 108d to open all paths through the switching element 83 to provide for a "broadcast" mode wherein an one particular processor 29 may "talk to" all of the memory modules in the Extended memory Module Array 13 and wherein any one memory module in the Extended Memory Module Array 13 may load each processor 29 in the Processor Array 11.

Data Base Memory

Referring again to FIG. 1, the Data Base Memory 17 is the window in the computational envelope approach of the present invention. All jobs to be run on the present invention are staged into the Data Base Memory 17. All output from the present invention is staged back through the Data Base Memory 17. Additionally, the Data Base Memory 17 is used as back-up storage for the Extended Memory module 13 for those problems whose data base is larger than the storage capacity of the Extended Memory Module 13. Control of the Data Base Memory 17 is from the Data Base Memory Controller 19 which accepts commands both from the Coordinator 21 for transfers between the Data Base Memory 17 and the Extended Memory 13, and from the Support Processor System (not shown) for transfers between the Data Base Memory 17 and the File Memory (not shown).

Figure 9:
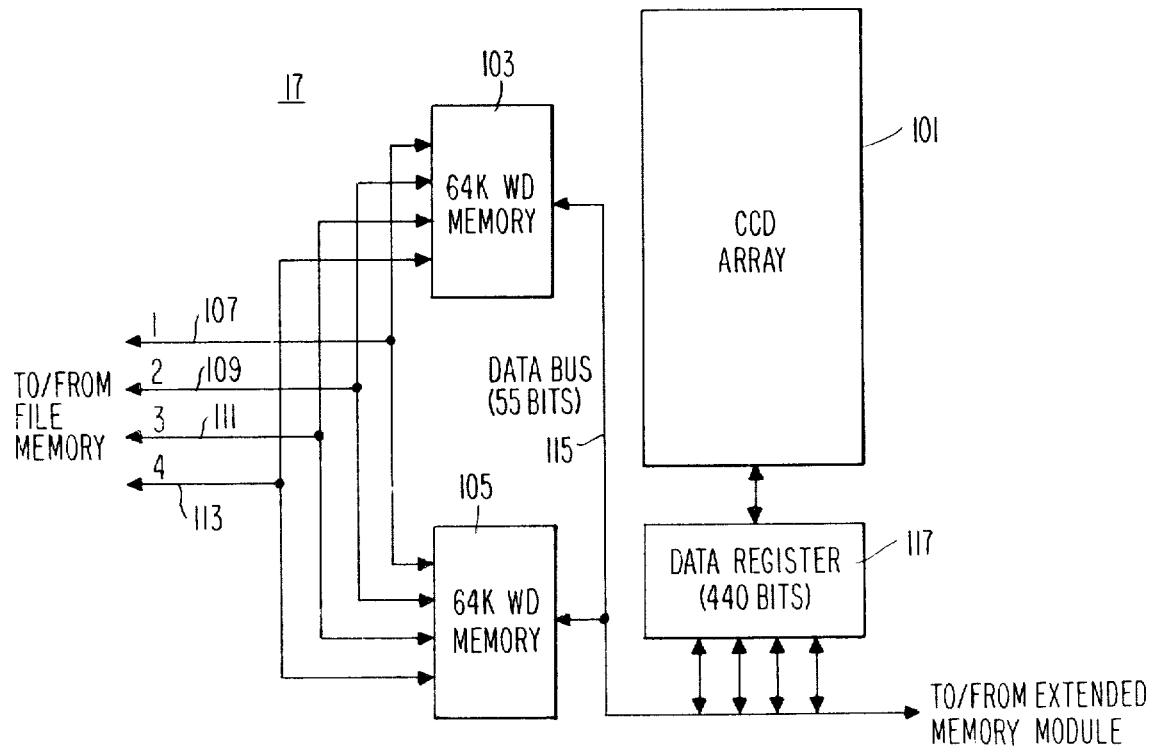
FIG. 9 is a logic diagram of a data base memory used to interface in a computational envelope architectural manner the parallel and multiprocessing array of the present invention and the support processor which provides programs, data and I/O communication with the user.

In the preferred embodiment of the invention, see FIG. 9, a general CCD (charged-coupled device) array 101 is used as the primary storage area, and two data block size buffers memories 103 and 105 of 64K word capacity each are used for interfacing to the secondary storage file memory. Experience in large data array systems and scientific array processors indicate that about 99% of the traffic between the data base memory 17 and the file memory is generally simple large data block transfers of program and data. To provide for high volume-high speed transfers, four data channels 107, 109, 111 and 113 are provided.

The buffer memories 103 and 105 are connected to the CCD array 101 through a data bus 115, preferably 55 bits wide, and a data register 117 of 440 bits width. The data bus 115 feeds directly to the Extended Memory Modules 21 with no additional buffering required except for the one-word (55 bit) I/O Buffer 51 (see FIG. 4) provided with each Extended Memory Module 21.

Data Base Memory Controller

The data base memory controller 19 interfaces two environments: the present invention internal environment and the file memory environment, since the Data Base Memory 17 is the window in the computational envelope. The Data Base Memory 17 allocation is under the control of the file memory function of the Support Processor. The Data Base Memory Controller 19 has a table of that allocation, which allows the Data Base Memory Controller 19 to convert names of files into Data Base Memory 17 addresses. When the file has been opened by a present invention program it is programmed as far as allocation is concerned, and remains resident in Data Base Memory 17 until either is closed or abandoned. For open files, the Data Base Memory Controller 19 accepts descriptors from the coordinator 21 which call for transfers between Data Base Memory 17 and Extended Memory Modules 13. These descriptors contain absolute Extended Memory Module 13 addresses but actual file names and record numbers for the Data Memory Base 17 contents.

Operation is as follows. When a task for the present invention has been requested, the Support Processor passes the names of the files needed to start that task. In some cases existing files are copied into newly named files for the task. When all files have been moved into the Data Base Memory 17, the task starts in the present invention. When the task in the present invention opens any of these files, the allocation will be frozen within the Data Base Memory 17. It is expected that "typical" task execution will start by opening all necessary files. During the running of a present invention task, other file operations may be requested by the user program on the present invention, such as creating new files and closing files.

Extended Memory Module 13 space is allocated either at compile time or dynamically during the run. In either case, Extended Memory Module 13 addresses are known to the user program. Data Base Memory 17 space, on the other hand, is allocated by a file manager, which gives a map of Data Base Memory 17 space to the Data Base Memory Controller 19. In asking the Data Base Memory Controller 19 to pass a certain amount of data from Data Base Memory 17 to Extended Memory Module 13, the Coordinator 21, as part of the user program, issues a descriptor to the Data Base Memory Controller 19 which contains the name of the Data Base Memory 17 area, the absolute address of the Extended Memory Module 13 area, and the size. The Data Base Memory Controller 19 changes the name to an address in Data Base Memory 17. If that name does not correspond to an address in Data Base Memory 17, an interrupt goes back to the Coordinator 21, together with a result descriptor describing the status of the failed attempt.

Not all files will wait to the end of a present invention turn to be unloaded. For example, the number of snapshot dumps required may be data dependent, so it may be preferable to create a new file for each one and to close the file containing a snapshot dump so that the File Manager can unload it from Data Base Memory 17. When the present invention task terminates normally, all files that should be saved are closed.

Although the present invention has been described with reference to its preferred embodiment it is understood by those skilled in the art that many modifications, variations, and additions may be made to the description thereof. For example, the number of processors or memory modules in the arrays thereof may be increased as specific processing and storage requirements may dictate. Also, although the Connection Network is described as an Omega network it is clear that any network having local mode control and the ability to decode path direction bits or flags on the fly may be used. Further, the Omega network may be doubled in size so as to minimize the effect of a single blocked path. Routine mapping algorithms may interpose actual memory module destinations and memory module port designations if desired. Additional gating may be provided in each switching element of the Connection Network to allow for a "wrap-around" path whereby processors may communicate with each other as well as with memory modules. The control from the Coordinator may be expanded so that there can be two separate broadcast modes; one to the processors, and the reverse to the memory modules.

Further, although the present invention has been described with a crossbar network having each switching element fashioned to examine all incoming data for a "strobe" or addressing bit, it is appreciated that once a "strobe" bit is detected and an "acknowledge" bit returned that logic could be provided to free up the bit position of the "strobe" bit for other purposes during the period when an acknowledged latch was present and data was being transferred through the switching element from a processor to a memory module. For example, the freed-up strobe bit position could be used for a parity bit for the data being transferred. Other like changes and modifications can also be envisioned by those skilled in the art without departing from the sense and scope of the present invention.

Thus, while the present invention has been described with a certain degree of particularity, it should be understood that the present disclosure has been made by way of example and that changes in the combination and arrangement of parts obvious to one skilled in the art, may be resorted to without departing from the scope and spirit of the invention.

What is claimed is:

1. An array processing system interfacing with a host processor for performing I/O functions and a file memory, said array processing system comprising:
    data base buffer memory means having at least one data transfer channel connected to the file memory under control of the support processor for rapid transfer of information therethrough, said data base memory means receiving parallel processing jobs from the file memory and returning to the file memory the processed resultants of the jobs received, said parallel processing jobs including both programs for vector and scalar processing and related data;
    an array of parallel memory modules connected via a second data transfer channel to said data base memory means, each memory module in said array storing data from said data base memory means during processing by said array processing system;
    an array of parallel processor means, each processor means being programmable for independently processing data fetched approximately in parallel from individual memory modules, each processor means having indicator means for indicating when a future operation must be initiated in parallel with at least one other processor means for indicating when it is ready to begin said future operation;
    connection network means interposing said array of parallel memory modules and said array of parallel processor means, said connection network means providing a plurality of data communication paths between said array of parallel memory modules and said array of parallel processor means wherein each provided data communications path in said plurality thereof is provided to a requested individual memory module from a requesting individual processor means; and
    coordinator means connected to each processor means for monitoring each said indicator means for indicating when a future operation must be initiated in parallel with at least one other processor means and for inhibiting each processor means so indicating from initiating said future operation until each processor means so indicating is also indicating that it is ready to begin it's future operation.

2. The array processing system according to claim 1 wherein:
    said array of parallel memory modules comprises an array of a prime number of identical memory modules; and
    said array of parallel processor means comprises an array of a power-of-two number of identical processors, said power-of-two number being the greatest power-of-two number less in value than said prime number.

3. The array processing system according to claim 2 wherein said prime number is 521 and said power-of-two number is 512.

4. The array processing system according to claim 1 wherein said data base memory means includes:
    a solid-state information storage unit; and
    a data base memory controller means for providing buffering and interfacing between said solid-state information storage unit and the file memory and between said solid-state information storage unit and said array of parallel memory modules.

5. The array processing system according to claim 1 wherein each processor in said array of parallel processor means further includes:
    an execution unit;
    a processor memory for storing instructions for execution by said execution unit; and
    a connection network buffer for interfacing between said connection network means and said execution unit.

6. The array processing system according to claim 1 wherein each memory module in said array thereof includes a solid-state random access memory unit sufficient in size to store 64,000 words of 55 bits each.

7. The array processing system according to claim 1 wherein:
    said connection network further includes means for providing simultaneously data communication paths to all processor means in said array thereof for broadcasting thereto from any memory module in said array thereof.

8. The array processing system according to claim 1 or claim 7 wherein:
    said connection network further includes means for providing simultaneously data communication paths to all memory modules in said array thereof for broadcasting thereto from any processor means in said array thereof.

* * * * *